United States Patent
Yasui et al.

(10) Patent No.: US 11,718,567 B2
(45) Date of Patent: Aug. 8, 2023

(54) POWDER FOR CERAMIC MANUFACTURING, CERAMIC MANUFACTURED OBJECT, AND MANUFACTURING METHOD THEREOF

(71) Applicant: CANON KABUSHIKI KAISHA, Tokyo (JP)

(72) Inventors: Nobuhiro Yasui, Yokohama (JP); Hisato Yabuta, Machida (JP); Kanako Oshima, Tokyo (JP); Hiroshi Saito, Kawasaki (JP); Yoshihiro Ohashi, Tokyo (JP); Makoto Kubota, Yokohama (JP); Akira Uebayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/736,067

(22) Filed: Jan. 7, 2020

(65) Prior Publication Data
US 2020/0140340 A1  May 7, 2020

Related U.S. Application Data

(63) Continuation of application No. PCT/JP2018/026539, filed on Jul. 13, 2018.

(30) Foreign Application Priority Data

Jul. 14, 2017 (JP) .................................. 2017-138505
Jul. 10, 2018 (JP) .................................. 2018-130952

(51) Int. Cl.
*C04B 35/50* (2006.01)
*C04B 35/106* (2006.01)
*C04B 35/14* (2006.01)

(52) U.S. Cl.
CPC ............ *C04B 35/50* (2013.01); *C04B 35/106* (2013.01); *C04B 35/14* (2013.01);
(Continued)

(58) Field of Classification Search
CPC ....... C04B 35/50; C04B 35/106; C04B 35/14; C04B 2235/5445; C04B 2235/665; C04B 2235/667
See application file for complete search history.

(56) References Cited

U.S. PATENT DOCUMENTS 4,855,102 A   8/1989  Okada et al.
6,676,853 B1  1/2004  Ueda et al.
(Continued)

FOREIGN PATENT DOCUMENTS

CN   1171379 A   1/1998
CN   1950192 A   4/2007
(Continued)

OTHER PUBLICATIONS

JPS59102865A translation (Year: 1984).*
(Continued)

*Primary Examiner* — Karl E Group
*Assistant Examiner* — Cameron K Miller
(74) *Attorney, Agent, or Firm* — Venable LLP

(57) ABSTRACT

Provided are a powder for laser manufacturing which can be stably manufactured and from which a three-dimensional manufactured object ensuring a manufacturing accuracy can be obtained and a using method thereof. A powder for ceramic manufacturing for obtaining a manufactured object by repeatedly sintering or fusing and solidifying in sequence a powder in an irradiation portion with laser light, in which the powder includes a plurality of compositions, at least one composition of the compositions is an absorber that relatively strongly absorbs the laser light compared to other (Continued)

compositions, and at least a part of the absorber changes to a different composition that relatively weakly absorbs the laser light by irradiation with the laser light and a using method of a powder in which the powder is used.

51 Claims, 6 Drawing Sheets

(52) U.S. Cl.
CPC .............. *C04B 2235/5445* (2013.01); *C04B 2235/665* (2013.01); *C04B 2235/667* (2013.01)

(56) References Cited

U.S. PATENT DOCUMENTS

| | | | |
|---|---|---|---|
| 8,283,843 | B2 | 10/2012 | Pan et al. |
| 9,114,567 | B2 | 8/2015 | Monsheimer et al. |
| 10,118,222 | B2 | 11/2018 | Monsheimer et al. |
| 10,556,835 | B2 | 2/2020 | He et al. |
| 2006/0008677 | A1* | 1/2006 | Bewlay .............. H01J 61/36 428/702 |
| 2018/0369909 | A1* | 12/2018 | Ibe ................ C04B 35/626 |
| 2019/0122945 | A1* | 4/2019 | Shiragami .......... C03C 3/14 |
| 2019/0134893 | A1 | 5/2019 | Yabuta et al. |
| 2019/0135705 | A1 | 5/2019 | Yasui et al. |
| 2019/0300441 | A1 | 10/2019 | Kubota et al. |
| 2021/0078908 | A1* | 3/2021 | Rosenflanz ........... C04B 35/50 |

FOREIGN PATENT DOCUMENTS

| | | | |
|---|---|---|---|
| CN | 101014552 | A | 8/2007 |
| CN | 104341622 | A | 2/2015 |
| CN | 104609867 | A | 5/2015 |
| CN | 104710982 | A * | 6/2015 |
| CN | 105732092 | A | 7/2016 |
| CN | 105832563 | A | 8/2016 |
| EP | 0 816 537 | A2 | 1/1998 |
| EP | 0816537 | A2 * | 1/1998 ........ C04B 35/117 |
| EP | 3 702 120 | A1 | 9/2020 |
| EP | 3 702 121 | A1 | 9/2020 |
| JP | 59-102865 | A | 6/1984 |
| JP | S59102865 | * | 6/1984 |
| JP | S59102865 | A * | 6/1984 |
| JP | 59-102865 | U | 7/1984 |
| JP | 63-230802 | A | 9/1988 |
| JP | H07149599 | A * | 6/1995 |
| JP | 10-017396 | A | 1/1998 |
| JP | 2001-123165 | A | 5/2001 |
| JP | 2013-518797 | A | 5/2013 |
| WO | 2011/097137 | A1 | 8/2011 |
| WO | 2017/104234 | A1 | 6/2017 |
| WO | 2017/110829 | A1 | 6/2017 |
| WO | 2019/013334 | A1 | 1/2019 |

OTHER PUBLICATIONS

JPS59102865A machine translation (Year: 1984).*
CN104710982A machine translation (Year: 2015).*
JPH07149599A machine translation (Year: 1995).*
Saito et al., U.S. Appl. No. 17/340,278, filed Jun. 7, 2021.
Notification of Reasons for Refusal in Japanese Application No. 2018-130952 (dated Feb. 2021).
Extended European Search Report in European Application No. 18832882.7 (dated Feb. 2021).
First Office Action in Chinese Application No. 201880048475.4 (dated Dec. 2020).
Notification of Reason for Refusal in Japanese Application No. 2018-130952 (dated Jul. 2020).
International Search Report in International Application No. PCT/JP2018/026539 (dated Aug. 2018).
Yves-Christian Hagedorn et al., "Net Shaped High Performance Oxide Ceramic Parts by Selective Laser Melting," 5 Physics Proc. 587-594 (2010).
International Preliminary Report on Patentability in International Application No. PCT/JP2018/026539 (dated Jan. 2020).
Second Office Action in Chinese Application No. 201880048475.4 (dated Sep. 2021).
Notice of Reasons for Refusal in Japanese Application No. 2022-004360 (dated Nov. 2022).

* cited by examiner

POWDER FOR CERAMIC MANUFACTURING, CERAMIC MANUFACTURED OBJECT, AND MANUFACTURING METHOD THEREOF

CROSS-REFERENCE TO RELATED APPLICATIONS

This application is a Continuation of International Patent Application No. PCT/JP2018/026539, filed Jul. 13, 2018, which claims the benefit of Japanese Patent Application No. 2017-138505, filed Jul. 14, 2017 and Japanese Patent Application No. 2018-130952, filed Jul. 10, 2018, all of which are hereby incorporated by reference herein in their entirety.

BACKGROUND OF THE INVENTION

Field of the Invention

The present invention relates to a powder that is used at the time of forming a ceramic manufactured object by laser irradiation and a manufacturing method using the powder.

Description of the Related Art

In recent years, additive manufacturing technologies have become widespread, and, particularly in the metal field, dense and diverse manufactured objects have been realized in powder bed fusion method. The denseness is attributed to the manufactured objects effectively fused and obtained as a solidified structure group. In such a status, a possibility of developing the additive manufacturing technologies for ceramic manufacturing has also been discussed, and a number of efforts have been reported. In order to fuse ceramic in the same manner as metal, it is necessary to inject commensurate energy, but the status is that, unlike metal, light diffusion occurs in powder, uniform fusion cannot be attained, and it is difficult to obtain a manufacturing accuracy. Therefore, ceramic is not fused but simply sintered, and thus manufactured objects are formed in pursuit of ensuring the manufacturing accuracy, but the denseness lacks.

In such a status, for example, Physics Procedia 5 (2010) 587 to 594 proposes a method in which an $Al_2O_3$—$ZrO_2$ eutectic system is used, whereby the melting point lowers, and a fine structure intrinsic to the eutectic system is formed when the eutectic system is fused and solidified, and a high mechanical strength is also realized. However, in spite of the fact that the improvement of the denseness of a manufactured object is successfully satisfied, a number of projections are generated on the surface of the manufactured object, and the status is that a sufficient manufacturing accuracy failed to be attained.

The wavelength of laser light is Nd:YAG (approximately 1 μm), and, even when the boiling points are lowered in the eutectic system, neither $Al_2O_3$ nor $ZrO_2$ clearly seem to absorb the light, and commensurate energy is required in order to fuse and solidify the material system. In such a system, light scattering occurs in powder, and there is a problem in that a desirably manufactured portion unevenly fuses, an uneven sintered region is broadly generated in the periphery of the desirably manufactured portion, or the like.

Furthermore, there is a case where a place that has been already processed such as a nearby region or a place in a lamination direction during laser scanning is processed again by the absorption of the laser light, and there is a problem in that the manufacturing accuracy is adversely affected.

Therefore, in order to improve the manufacturing accuracy, there is a demand for a material that is capable of suppressing light diffusion in powder, absorbs the laser wavelength, and has an absorption effect that decreases or disappears in a manufactured place so as to prevent the re-absorption of the laser light and an influence thereof.

SUMMARY OF THE INVENTION

A powder for ceramic manufacturing of the present invention is a powder for ceramic manufacturing for obtaining a manufactured object by repeatedly sintering or fusing and solidifying in sequence the powder in an irradiation portion with laser light, in which the powder includes a plurality of compositions, at least one of which is an absorber that relatively strongly absorbs the laser light compared to other compositions, and at least a part of the absorber changes to a different composition that relatively weakly absorbs the laser light by irradiation with the laser light.

In addition, manufacturing of a ceramic manufactured object for obtaining a manufactured object by repeatedly sintering or fusing and solidifying in sequence a powder in an irradiation portion with a laser light includes:
(i) a step of disposing the powder for ceramic manufacturing in a laser irradiation portion,
(ii) a step of sintering or fusing and then solidifying the powder for ceramic manufacturing by irradiating the powder for ceramic manufacturing with a laser on the basis of three-dimensional manufacturing data, and
(iii) a step of manufacturing a manufactured object by repeating the steps (i) and (ii).

Further features of the present invention will become apparent from the following description of exemplary embodiments with reference to the attached drawings.

DESCRIPTION OF THE EMBODIMENTS

Figure 1:
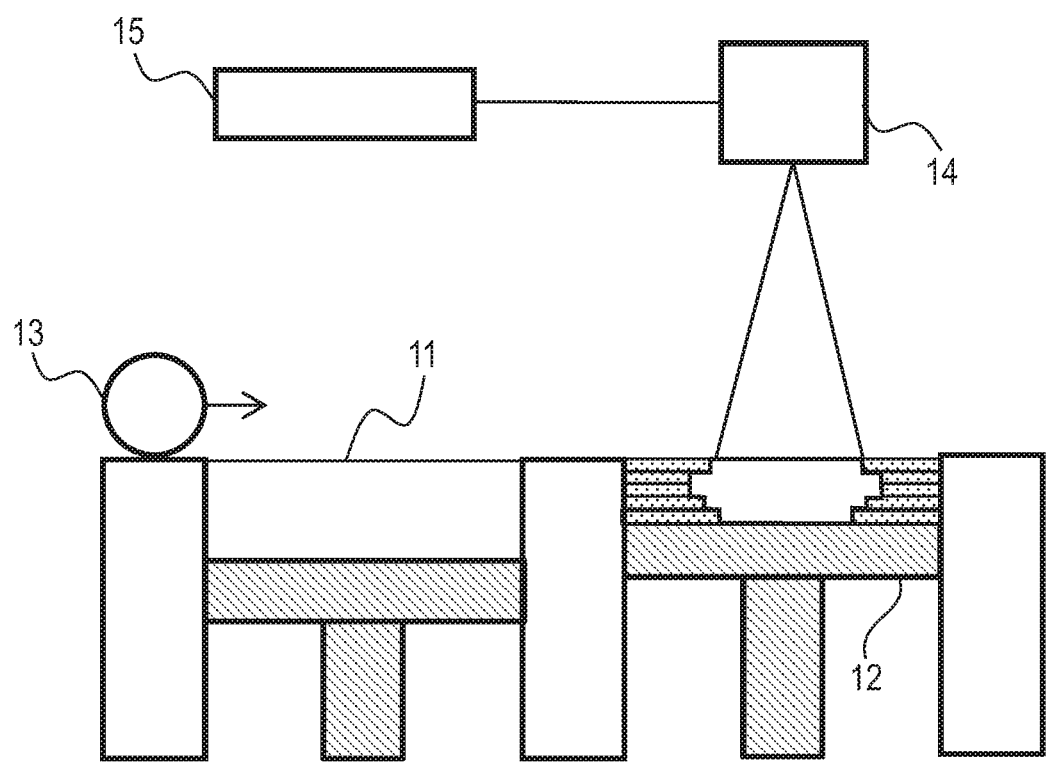
FIG. 1 is a view illustrating an example of a manufacturing machine to which a powder of the present invention can be applied.

Hereinafter, an embodiment of the present invention will be described with reference to attached drawings. First, a powder, a composition, and an absorber in the present invention will be described. The powder is an aggregate of particles that can be recognized as independent grains. In addition, the powder is made up of a plurality of compositions. The composition is constituted of a plurality of components (elements or compounds). In addition, the powder being made up of a plurality of compositions means a case where a number of kinds of particles made of a composition are present in a mixed manner or a case where one kind or a number of kinds of particles made up of a plurality of kinds of compositions are present in a mixed manner. The absorber is defined as a composition having a relatively strong absorption capability for laser light being used than other compositions forming the powder. In other words, the absorber has the strongest absorption capability for laser light among the compositions included in the powder. At least one composition forming the powder of the present invention is an absorber having an absorption capability for laser light. The absorption capability of the absorber is preferably an absorptance of 10% or more for laser light having a wavelength being used. In addition, a case where the absorptance is 40% or more is more preferred, and, furthermore, a case where the absorptance is 60% or more is most preferred. As a method for measuring the absorptance of an absorber simple substance, an ordinary spectrometer may be used, and the absorptance is measured by irradiating the absorber simple substance loaded on a specimen plate with an assumed wavelength (close to a laser wavelength being used during manufacturing). An absorptance in a case where there is no specimen is regarded as a reference data, and the absorptance is calculated from a ratio thereof (Powder)

A powder of the present invention is constituted of a plurality (two or more) of compositions, and the plurality of compositions include at least one composition that is an absorber. Individual particles forming the powder may be made of a single composition, and one particle may be made of a plurality of compositions. Hereinafter, each case will be sequentially described.

A first case is a case of a state in which the powder is constituted of particles made of a single composition. As an example, a state in which a plurality of compositions are constituted of three kinds of $Al_2O_3$, $ZrO_2$, and $Tb_4O_7$ (absorber), $Al_2O_3$ particles, $ZrO_2$ particles, and $Tb_4O_7$ particles are present respectively, and the powder is formed as a mixture of these particles is exemplified.

A second case is a case of a state in which the powder includes particles constituted of two or more kinds of compositions. As an example, in a case where compositions are constituted of three kinds of $Al_2O_3$, $ZrO_2$, and $Tb_4O_7$ (absorber), a state in which the powder is constituted of particles made up of $Al_2O_3$—$ZrO_2$—$Tb_4O_7$ alone or a state in which $Al_2O_3$—$ZrO_2$ form the same particle so that the particles are referred to as $Al_2O_3$—$ZrO_2$ particles and $Tb_4O_7$ particles is exemplified. Particularly, in the case of a configuration in which the absorber is contained together with the other compositions in the same particle, the powder is preferably formed by maintaining the $Tb_4O_7$ state in $Tb_4O_7$ that is an example of the absorber of the present invention. Furthermore, a status in which the composition that is the absorber forms particles singly regardless of how the other compositions are formed is preferred.

In addition, for the powder of the present invention, in a situation in which a powder bed layer is configured using a recoater in powder bed fusion method or a situation in which the powder is sprayed from a nozzle in a cladding method, the fluidity of the powder is important. As the powder, a powder having a fluidity index that satisfies 40 [sec/50 g] or less is preferably used. In order to endure the fluidity, the particle preferably has a spherical shape. However, as long as the fluidity index is satisfied, the particle does not necessarily have a spherical shape.

Furthermore, the particle diameter (the particle diameter refers to a middle value of not a single particle but a group of particles forming the same composition) of a particle of the composition forming the absorber is preferably ⅕ or less of the particle diameter of a particle of the composition that is not the absorber. Therefore, the particle diameter of the particle forming the absorber is preferably 1 μm or more and 10 μm or less, and thus it is important that the particle diameter of the composition other than the absorber is 5 μm or more and satisfies the above-described condition.

In addition, the powder of the present invention preferably does not contain a resin binder. This is because, in a case where the powder contains a resin binder, there is a case where a process of the resin binder violently vanishing by laser irradiation occurs, and there is a possibility that the resin binder may cause a pore or the like to be present in a manufactured region. Furthermore, when carbon is contained, carbon bonds to oxygen and turns into gas, and thus there is a concern that the volume occupied by a carbon component may become pores, and thus the amount of carbon is preferably small. Therefore, the content of carbon is preferably 1000 ppm or less of a metal element of the plurality of compositions forming the powder in terms of the molar ratio.

In addition, when carbon is contained, carbon is oxidized by laser irradiation and gasified, thereby adversely affecting manufacturing. Thus, like the absorber of the present invention, carbon is preferably changed to another composition by laser irradiation and incorporated into a manufactured object.

Hitherto, the absorber, the compositions, and the particles have been described, and it does not matter whether the powder for ceramic manufacturing in the present invention is in a crystal or amorphous state, a mixture thereof, or the like. In addition, the compositions of the powder and the manufactured object do not need to completely coincide and, particularly, may differ in an oxidation state, a nitration state, or the like. Therefore, it is preferable to control the atmosphere during a manufacturing process, and it is also preferable to set the atmosphere not only to an atmospheric condition but also to an inert state of nitrogen or other rare gas atmosphere, a state in which reduction is facilitated by partially containing hydrogen, reducing pressure, or the like, and, furthermore, an oxygen atmosphere. Such a control of the atmosphere does not exclude the inclusion of a composition in a partially metallic state as the powder of a raw material.

The present invention is the powder for ceramic manufacturing, but is not limited to a state in which the manufactured object is formed of ceramic made of 100% of crystals, and, in a case where a desired property value can be obtained, a region in an amorphous state, a region that is reduced to be in a nearly metallic state, or the like may be formed in a part or majority of the manufactured object.

(Absorber)

An absorber preferred in the present invention absorbs laser light, sinters or fuses the powder in an irradiation section with the laser light by the amount of heat of the laser light to be converted to a concrete, and remains in the manufactured object. At this time, a part of the absorber changes to a different composition having a relatively weak absorption capability for the laser light and is incorporated into the manufactured object. Therefore, in a region in which the absorber is converted to the concrete, a smaller amount of laser light is absorbed than in the powder before the irradiation with the laser light.

The action and effect of the absorber of the present invention will be described in detail.

A first action effect is that the absorber efficiently absorbs laser light that is used during manufacturing and increases in temperature, thereby affecting the other compositions present in a region as large as a focal size of the laser light and increasing the temperature. Therefore, more effective local heating is realized, an interface portion between a processed region (a region irradiated with the laser light) and a non-processed region (a region not irradiated with the laser light) is clarified, and the manufacturing accuracy improves.

A second action effect is that a region that is irradiated with the laser light, thereby completing a manufacturing process absorbs less light, and thus it is possible to suppress an adjacent region in a layer in a portion on which a process is soon to be executed or a region in a lower layer absorbing the laser light again and modifying. In addition, an influence on the adjacent region or the region in the lower layer in which manufacturing is finished is suppressed, and thus a process margin such as a laser irradiation condition is broadly established, and it is also possible to decrease an adverse influence of the fluctuation of the irradiation condition on the manufacturing accuracy.

In the case of carrying out manufacturing by selecting laser light and irradiating the powder for ceramic manufacturing of the present invention with the laser light, manufacturing with a higher accuracy can be realized due to the first action effect and the second action effect.

Figure 3:
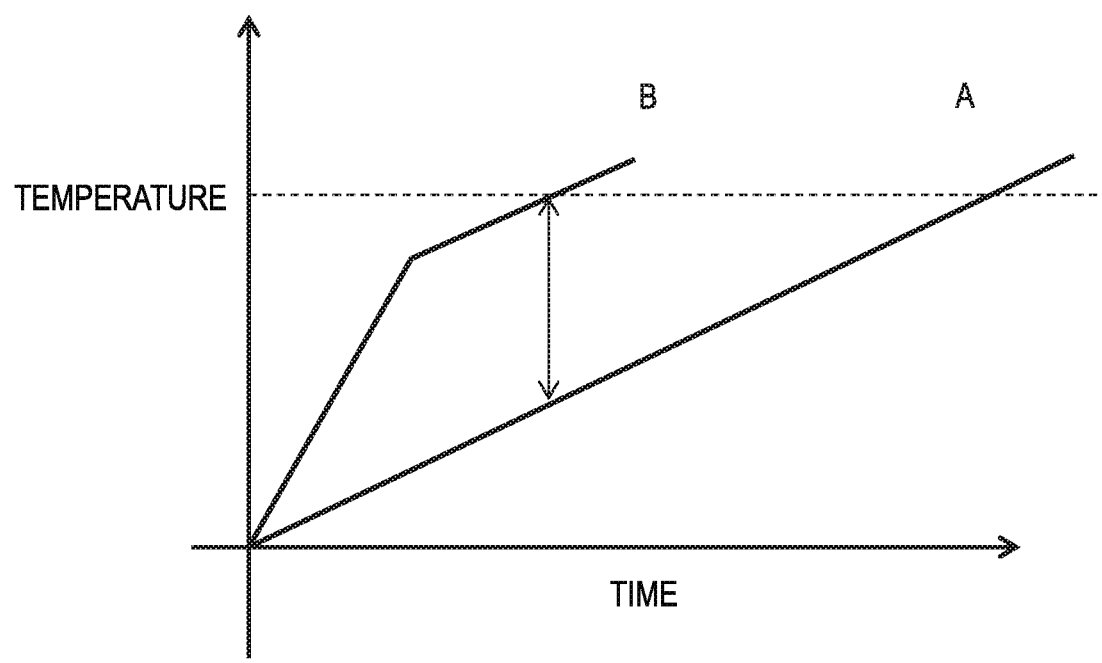
FIG. 3 is a conceptual view illustrating temperature increase processes of a powder containing an absorber of the present invention and a powder for reference not containing the absorber.

Such a status will be described with reference to FIG. 3 that is a conceptual view. The horizontal axis indicates a laser irradiation time, and the vertical axis indicates the temperature of a laser-irradiated region. In lines A and B in FIG. 3, the line A indicates a characteristic of a powder not including an absorber. In the line A, the temperature begins to increase by laser irradiation, linearly exceeds to the melting point, which makes the powder dissolve, and reaches a manufacturing temperature indicated by a dotted line. On the other hand, the line B indicates a characteristic of a powder including the absorber of the present invention. In the line B, the temperature begins to abruptly increase by laser irradiation due to the light absorption effect of the absorber, the effect of the absorber weakens immediately before the powder dissolves, and the temperature-rise rate becomes close to that of the line A for the case of the powder not including the absorber.

In the powder showing the characteristic of the line A, the heating efficiency is poor, a broad low-density sintered portion is generated in a boundary between a portion that has been fused and solidified and the powder in the region irradiated with the laser light, even an adjacent powder portion is broadly affected, and a spatial manufacturing accuracy cannot be obtained.

On the other hand, in the powder showing the characteristic of the line B, the heating efficiency is favorable, and local heating is realized. Therefore, when a laser-irradiated region is formed, a temperature difference with an adjacent region can be sufficiently ensured, and thus, in the boundary between the portion that has been fused and solidified and the powder, only a narrow sintered portion is generated, and a favorable manufacturing accuracy is obtained. Furthermore, a completely manufactured portion that has been irradiated with laser does not absorb light and shows a characteristic like that of the line A, and thus, even when the process condition fluctuates and laser light affects the existing manufactured region, an increase in temperature by the laser light is relatively small, and it is possible to avoid the influence of the increase in temperature. Meanwhile, a region that is being irradiated with a laser and a region that has been irradiated are bonded together by fusion attributed to thermal conduction between both regions, and thus the connection or strength of a boundary portion between laser-drawn lines is maintained. In such a manner, in the case of having the characteristic of the line B of the present invention, the above-described two effects can be obtained.

As the absorber of the present invention, as long as at least a part of the absorber changes to a different composition that relatively weakly absorbs light by laser irradiation, any absorber can be used without any limitations, but the absorber is preferably selected from metal oxides. The reason is that, in a metal oxide, the separation of oxygen caused by an increase in temperature changes the valence of a metal element, and there is a metal oxide that easily changes to a different metal oxide that relatively weakly absorbs laser light (for example, $Tb_4O_7 \rightarrow Tb_2O_3$, a gadolinium (Gd) site in $GdAlO_3$ is substituted with $Tb^{3+}$ or the like). In addition, the reason is that the metal oxides also have a high affinity to the other compositions forming ceramic and can be incorporated into a manufactured object.

As the metal oxide in which the valence change with respect to a variety of laser wavelengths functions as a change in the absorptance, an oxide of metal selected from Ti, V, Cr, Mn, Fe, Co, Ni, Cu, Zn, Zr, Nb, Mo, Hf, Ta, W, In, Sn, Bi, Ce, Pr, Sm, Eu, Tb, and Yb is preferably used. For Nd:YAG laser (1,070 nm) that is a typical laser used for manufacturing, an oxide of Tb or Pr is preferably used, and an oxidation state thereof is more preferably $Tb_4O_7$ or $Pr_6O_{11}$. However, the metal oxide is not limited to the case of the ratio (compositional ratio) of the above-described molecular formula, and, as long as a desired absorption effect can be obtained, a metal oxide having a different ratio or in a mixed state therewith can also be used.

Next, terbium oxide that is most preferred as a composition of the absorber of the present invention will be described in detail as an example. Terbium oxide can be in diverse states, and typical examples are a state referred to as $Tb_4O_7$ and a state referred to as $Tb_2O_3$. In the molecular formula, the expression of $Tb_4O_7$ does not strictly limit a ratio of 4:7. At this time, $Tb_4O_7$ is a substance in which a half is formed of $Tb^{4+}$ and the other half is formed of $Tb^{3+}$, but $Tb_2O_3$ is only formed of Tb'. The high infrared absorptance of $Tb_4O_7$ is significant near 1,070 nm of an Nd:YAG laser, exceeds 60%, and reaches 70% in some cases. Meanwhile, when $Tb^{3+}$ gradually decreases, the absorptance decreases, and, in a $Tb_2O_3$ state that is only formed of $Tb^{3+}$, reaches approximately 7%. Therefore, it is clear that a decrease in $Tb^{3+}$ decreases the absorptance, and thus, as the absorber, terbium oxide ($Tb_4O_7$) including tetravalent terbium is preferred as one of compositions realizing the present invention.

In addition, in order to obtain an absorptance of 10% (at the time of measuring an absorber simple substance), the amount of $Tb^{3+}$ needs to be approximately 10% of the total amount of $Tb^{3+}$ and $Tb^{4+}$. Here, as a method for evaluating the valence, X-ray absorption fine structure (XAFS) can be applied. The rising energy of an absorption end varies with the valance, and thus the valence can be evaluated from the ratio thereof. Additionally, the valence can be evaluated by driving X-ray photoelectron spectroscopy (XPS) or electron spectroscopy for chemical analysis (ESCA), electron spin resonance (ESR), or the like which is an ordinary evaluation method.

Meanwhile, in an oxide in which the ratio between a metal element and oxygen is 2:3, the metal element is stabilized at a valence of 3+, and thus, after being converted to a concrete, the oxide is present in a solid solution state in another composition (for example, $Y_2O_3$ or $Gd_2O_3$, additionally, $R_2O_3$ (R: metal element)). Therefore, a region that has been converted to a manufactured concrete does not significantly absorb light. In addition, in a multi-element oxide or the like as well, in a compound in which $R^{3+}$ is stable, an R site is substituted with Tb, whereby the same state can be realized. In addition, in $ZrO_2$, a solid solution is formed to contribute to the stabilization of a fluorite structure, and, at this time as well, the valence becomes 3+. As such, the absorber of the present invention also functions as a material forming the manufactured object.

In addition, in order to obtain the effect of the present invention, the absorptance preferably differs by 1.2 times or more and more preferably differs by 2 times or more before and after a process is carried out by irradiation with laser light. Alternatively, the absorptance is preferably 50% or more before the process is carried out and 40% or less after the process has been carried out. Alternatively, the absorptance is preferably 60% or more before the process is carried out and 20% or less after the process has been carried out. $Tb_4O_7$ that is an example of the absorber is preferably used as a composition from the viewpoint of attaining this status. Meanwhile, this absorptance is an absorptance of an absorber simple substance.

As long as the absorber is contained in a plurality of compositions, an effect thereof can be obtained, but the content of a composition that is the absorber is preferably 0.5 vol % or more and 53 vol % or less of the powder. Here, the reason for using "vol %" is that the size of an area occupied by the absorber relative to the irradiation size (focal size) of the laser light is important and a change in the compositions forming the powder cannot be dealt with by the expression of "mol %".

The above-described lower limit value of the content of the absorber is determined from the necessity of including at least one particle of the absorber in the laser focal size. The upper limit value is determined from an influence on a principal composition forming the manufactured object. When the laser focal size is 10 μm, a region fused by the laser is regarded as a semispherical shape having a diameter of 10 μm, and the content of the absorber is approximately 0.5 vol % in a state in which a single particle of the absorber having a diameter of 1 μm is present in the region, and thus the lower limit value of the absorber content is preferably set to 0.5 vol % or more.

In addition, regarding the upper limit value, when $Tb_4O_7$ is added to $Al_2O_3$ that is versatile as structural ceramic, $Tb_3Al_5O_{12}$ is formed. In order to form a complex system with $Tb_3Al_5O_{12}$ using a characteristic of $Al_2O_3$ ceramic, the content of $Tb_4O_7$ needs to be set to 53 vol % or less, and, in this case, a status in which a slight amount of $Al_2O_3$ is dispersed in a grain boundary in a principal phase of $Tb_3Al_5O_{12}$, and thus the upper limit value is preferably 53 vol %.

In addition, the particle diameter of the absorber is also important, and is preferably 10 μm or less, more preferably 1 μm or more and 10 μm or less, and most preferably 1 μm or more and 5 μm or less. Here, the particle diameter in the present invention defines a range of a middle value of a particle size distribution of particles made of the same composition and does not mean that a particle diameter outside the range is not included. In addition, the measurement of the particle diameter is applied not only to a particle in a single crystalline state but also to a polycrystalline state or an agglomerated state. The composition that is the absorber may form a particle as a simple sub stance.

In a case where the composition that is the absorber forms particles as a simple substance, when 0.5 vol % of the absorber is contained, the particle diameter is 1 μm, and the tamped density of a powder layer is 50% of the true density, one particle is included in a region that a laser focal size of 10 μm heats (a volume of a semispherical shape made of a focal size diameter), and the absorber effect is obtained. In addition, in a case where the particle diameter is 10 μm, one particle is included in a region that a laser focal size of 100 μm heats, and thus it becomes important to select a particle diameter of the absorber in accordance with the laser focal size.

From the viewpoint of uniformity, a state in which at least two absorber particles are included in the laser focal size is more preferred. The interval between individual absorber particles is preferably 100 μm or less and more preferably 50 μm or less. In addition, it is also preferable to adjust the laser focal size so that such a status can be realized. As described above, from the viewpoint of the manufacturing accuracy, when the upper limit of the laser focal size is assumed to be 100 μm, as described above, the particle diameter of the absorber is preferably 1 μm or more and 10 μm or less. However, the laser focal size may be 100 μm or more in accordance with a desired manufacturing accuracy.

Meanwhile, from the viewpoint of ensuring the fluidity of the powder, the middle value and the shape of a particle size distribution of particles of a composition that is a base material, but is not the absorber of the manufactured objects, is desirably a 5 μm or more spherical shape. In addition, the particle diameter of the absorber is in a range of 1 μm or more and 10 μm or less and preferably as small a particle diameter as possible. The reason therefor is a viewpoint of the dispersibility of the absorber in the powder or a high packing density. In addition, in the present invention, the particle diameter of the absorber is preferably ⅕ or less of the particle diameter of the composition other than the absorber.

(Composition Other than Absorber)

As the composition other than the absorber, a composition forming a principal component as a ceramic structure is exemplified. Such a composition significantly contributes to a characteristic such as strength in a final manufactured object, and thus the composition is supposed to be appropriately selected depending on uses. Therefore, it is preferable to determine the absorber for the wavelength of laser light that is used during manufacturing, thereby selecting a composition that is one or more principal components from metal oxides having a relatively weak absorption effect, and it is also preferable to select a compound or mixture thereof. Particularly, as versatile structural ceramic, aluminum oxide or zirconium oxide (stabilization and meta-stabilization) can be used. Furthermore, it is also possible to use silicon oxide, silicon nitride, and aluminum nitride. Silicon nitride exhibits a laser absorption effect, but has an absorptance that does not change before and after the process, and thus does not function as the absorber of the present invention. Furthermore, it is also possible to select a ceramic material such as cordierite ($2MgO·2Al_2O_3·5SiO_2$), zircon ($ZrO_2·SiO_2$), mullite ($3Al_2O_3·2SiO_2$), yttrium oxide, or aluminum titanate. In addition, the composition may be a mixture of the respective materials described above.

In addition, the composition used as the principal component may further include a silicon oxide particle having a small diameter of less than 5 µm. The function of the silicon oxide particle will be described below in detail.

When the powder for ceramic manufacturing is irradiated with laser light, the absorber in an irradiation part absorbs energy and generates heat. Small-diameter silicon oxide has a particle diameter that is as small as less than 5 µm and is easily fused, and thus the heat from the absorber first fuses small-diameter silicon oxide particles present in the periphery of the absorber. In addition, the fused small-diameter silicon oxide particles transfer heat to other particles having a relatively large particle diameter, and the particles fuse. The small-diameter silicon oxide particles fused in an irradiated region with laser light soften, change in form, and come into contact with other particles having a relatively large particle diameter in a broad area, thereby efficiently transferring heat to the surfaces of the particles. Therefore, compared with a case where the small-diameter silicon oxide particles are not included, it is possible to more uniformly transfer heat to other particles having a relatively large particle diameter. As a result, the temperature distribution in the powder for ceramic manufacturing during fusion becomes small, and the cooling rate during solidification becomes uniform depending on places. Therefore, thermal stress decreases, the generation of microcracks during solidification is suppressed, and a ceramic manufactured object having a small number of microcracks is obtained. In addition, as a separate effect, in a case where a silicon oxide component is contained in the powder during solidification or forms a compound with the other compositions that are used as a principal component, the thermal conductivity becomes relatively low, quenching during solidification is relaxed, and the generation of microcracks is suppressed. The ceramic manufactured object having a small number of microcracks has a high mechanical strength and a low water absorption ratio and thus can be applied to a member requiring a strength and a low water absorption ratio like a vacuum device component.

As described above, the particle diameter of the small-diameter silicon oxide particle is smaller than the particle diameter of a particle made of the other composition, and the diameter is preferably less than 5 µm. In a case where the powder is constituted of a plurality of kinds of particles, the particle diameter of the small-diameter silicon oxide particle is preferably smaller than the particle diameter of each of the plurality of kinds of particles. The reason therefor is that, when the particle diameter is small, the small-diameter silicon oxide particles are likely to lead fusion together with the absorber, and the softened small-diameter silicon oxide particles are more uniformly distributed than other particles, and thus it is possible to further narrow the temperature distribution in the powder for ceramic manufacturing during fusion. The small-diameter silicon oxide particle preferably has a spherical form from the viewpoint of the fluidity, but may have an anisotropic shape such as an irregular shape, a plate shape, or a needle shape. The small-diameter silicon oxide particles preferably have a narrow particle size distribution. This is because, when the particle sizes are similar to each other, it is possible to more uniformly distribute the small-diameter silicon oxide particles in the powder for ceramic manufacturing and, when softened, more uniformly distribute the small-diameter silicon oxide particles on the surfaces of particles made of the other composition.

The mass of the small-diameter silicon oxide particles included in the powder for ceramic manufacturing is preferably 0.04% or more and 5.0% or less of the mass of the particles of the absorber. When 0.04% or more of $SiO_2$ particles are included, the water absorption ratio can be set to 1.0% or less, which is desirable.

In addition, when the mass of the small-diameter silicon oxide particles is 5.0% or less of the mass of the particles of the absorber, almost all of the small-diameter silicon oxide particles present between the particles of the composition used as the main component or the like fuse. There are no small-diameter silicon oxide particles remaining unfused which may cause a decrease in the mechanical strength of the ceramic manufactured object, which is more desirable. In addition, the small-diameter silicon oxide particles are fused by irradiation with laser light and play a role of the heating medium, and then some of the small-diameter silicon oxide particles turn into glass and are distributed on the surface of the ceramic manufactured object and in the ceramic manufactured object. When a large amount of the small-diameter silicon oxide particles are included in the powder at the time of the solidification of the powder for ceramic manufacturing, there is a possibility that a number of glass regions derived from the small-diameter silicon oxide particles are formed in the ceramic manufactured object and the mechanical strength of the ceramic manufactured object is decreased. Therefore, the mass of the small-diameter silicon oxide particles is more preferably 1.0% or less of the mass of the particles made of the composition that is the principal component.

The powder of the present invention is made up of a plurality of compositions and preferably includes at least one component as the absorber and at least any one component of aluminum oxide, zirconium oxide, and silicon oxide as a principal component forming a ceramic structure. Aluminum oxide, zirconium oxide, and silicon oxide are preferred due to their weaker absorption capability than the absorber and are capable of forming a eutectic system together with a number of material systems, maintaining a high strength by the development of a fine structure, and obtaining an effect for lowering the melting point. For example, in aluminum oxide, in the case of a mixture of two kinds of oxides with $Tb_4O_7$ that is the absorber, a change from $Tb_4O_7$ during manufacturing generates a composition related to $Tb_3A_{15}O_{12}$ or $TbAlO_3$. Meanwhile, in zirconium oxide, $Tb_4O_7$ plays a role of stabilizing the zirconium oxide to be tetragonal in a state of $Tb_3^+$. In addition, it is also preferable that aluminum oxide and zirconium oxide are included at the same time as compositions and form a three-component powder together with the absorber. It is also possible to select not only a eutectic composition but also $Al_2O_3:ZrO_2$=85:15 wt %, 70:30 wt %, or the like. In addition, silicon oxide is preferably formed as a manufactured object regardless of the state (crystalline or amorphous). Furthermore, silicon oxide also preferably forms not only a composition of two kinds of oxides together with the absorber, but also a three-component or four-component powder including zirconium oxide, aluminum oxide, and the like. Furthermore, in a silicon oxide-containing manufactured object, zircon, mullite, silicate with the absorber, or the like may be included.

While there is no limitation in the present invention, the plurality of compositions are preferably contained in a relationship of forming a eutectic composition. The eutectic composition is a composition at a eutectic point shown in a eutectic phase diagram; however, in the manufacturing process of the present invention in which laser light is used, a heating and cooling state is repeated at an extremely fast speed, and the state is far away from the equilibrium state. Therefore, the eutectic composition is preferably defined as a composition range in which a eutectic structure is formed, and a permissible margin is a range of ±10 mol % from a point referred to as the eutectic composition in the eutectic phase diagram.

Next, preferably, at least one rare-earth oxide that is not the absorber is included. A metal element of the rare-earth oxide is preferably selected from Sc, Y, La, Ce, Nd, Sm, Eu, Gd, Dy, Ho, Er, Tm, Yb, and Lu. In this case, depending on compositions, with respect to $R_2O_3$ ($RO_2$ depending on cases), $RAlO_3$, $R_3Al_5O_{12}$, or the like may be formed, and, in a case where compositions are capable of forming a new composition, the composition is also preferably used. Depending on cases, the composition is also preferably a eutectic composition. In addition, a material system made of $Tb^{3+}$ or $Pr'$ is also applicable.

(Use of Powder for Ceramic Manufacturing of Present Invention)

The powder for ceramic manufacturing of the present invention is used in a manufacturing process (manufacturing method) of a manufactured object by irradiation with laser light. The manufacturing process has (i) a step of disposing the above-described powder for ceramic manufacturing of the present invention in an irradiation portion with laser light, (ii) a step of irradiating the powder for ceramic manufacturing with laser light on the basis of three-dimensional manufacturing data, thereby sintering or fusing and then solidifying the powder for ceramic manufacturing, and (iii) a step of repeating the steps (i) and (ii) to form a manufactured object.

The expression of sintering or fusion and then solidification in the present invention does not necessarily define a case where the powder is not fused at all as sintering and a case where there is no powder remaining unfused as fusion. Currently, there is also a term "liquid-phase sintering", and the regions of individual terms become ambiguous. Therefore, sintering by which powders are bonded to each other, liquid-phase sintering after which a dissolved substance is present so as to surround powder, and, furthermore, dissolution after which some of powder remains unfused are also not excluded in interpretation.

In addition, in the manufacturing process of the present invention, if there is a necessity, after the step of forming a manufactured object, a heat treatment is preferably carried out. In this case, heating means is not limited and can be selected and used depending on purposes such as a resistance heating method, an induction heating method, an infrared lamp method, a laser method, or an electron beam method. The heat treatment is also suitable for the adjustment of the crystal grain diameter of the manufactured object for the purpose of improving the denseness or strength of the manufactured object or the like. In addition, as a glaze in the heat treatment, immersion, application, or the like is preferably carried out regardless of an organic material or an inorganic material.

In the using method of the present invention, the steps (i) and (ii) may be carried out by spreading and evening the powder of the present invention and then irradiating the powder with laser light. In addition, the steps (i) and (ii) may also be carried out by spraying the powder of the present invention to a predetermined place and irradiating the predetermined place with laser light.

Specifically, as a method for repeating sintering or fusing and solidifying in sequence in the irradiation portion with laser light and obtaining the manufactured object, there is so-called powder bed fusion method or a cladding method. The wavelength of laser light being used is not limited, but it is preferable to use laser light that is adjusted to a desired focal size of 10 µm to 2 mm in a lens or a fiber. The focal size is one of parameters affecting the manufacturing accuracy, and, in order to satisfy a manufacturing accuracy of 0.1 mm, while depending on situations, the line width is preferably approximately identical thereto, and a focal size of 100 µm or less is preferred. Meanwhile, it does not matter whether the irradiation with laser light is carried out continuously or in a pulsed pattern. An example is an Nd:YAG laser, and the wavelength is near 1,070 nm.

The powder bed fusion method will be described with reference to FIG. 1. A machine that is used in this method includes a powder vessel 11, a manufacturing stage portion 12, a recoater portion 13, a scanner portion 14, a laser light source 15, or the like. As a movement, powder is operated using the recoater portion 13 while the powder vessel 11 and the manufacturing stage portion 12 appropriately move up and down, and the powder is thinly spread and evened in a region broader than a manufactured object to be manufactured. Furthermore, one cross-sectional shape of the manufactured object is directly drawn on a powder layer using laser light generated from the laser light source 15 and the scanner portion 14. The drawn region is sintered or fused and solidified, this operation is repeated to laminate cross sections of the manufactured object, and a final manufactured object is formed.

Figure 2:
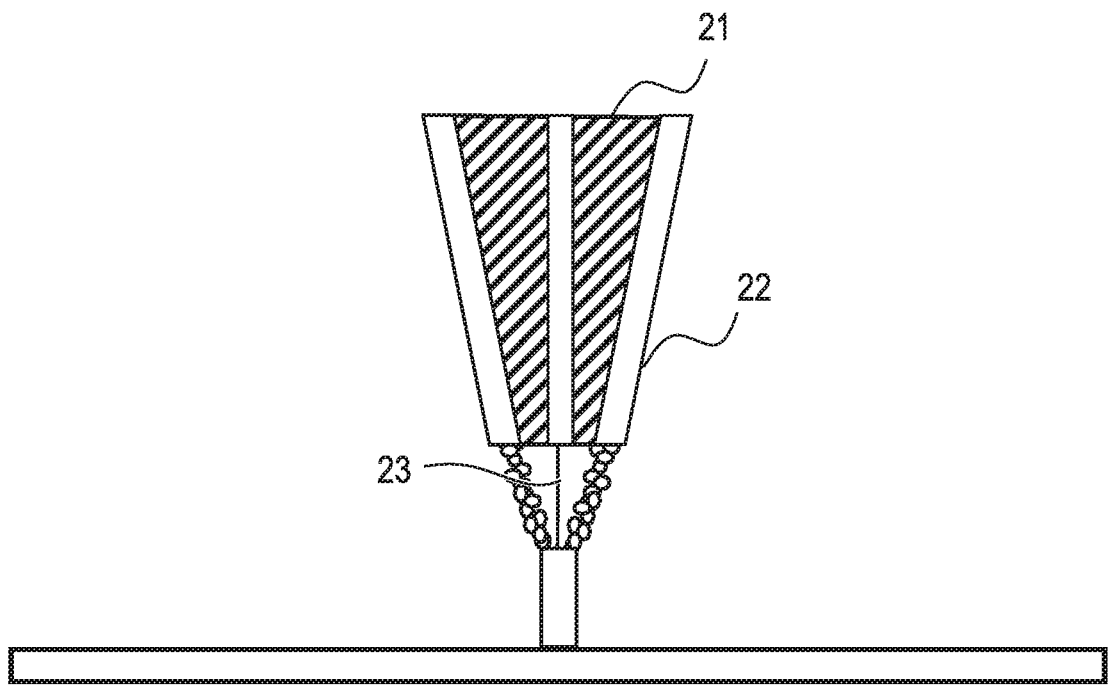
FIG. 2 is a view illustrating another example of the manufacturing machine to which the powder of the present invention can be applied.

The cladding method will be described using FIG. 2. The cladding method is a method in which powder is sprayed from a plurality of powder supply holes 22 present in a cladding nozzle 21, and a region in which the powder is focused is irradiated with laser light 23, thereby sequentially forming a manufactured object in a desired place and has a characteristic of being capable of manufacturing powder to a curved surface or the like.

The above-described manufacturing process of the present invention enables stabilized manufacturing and enables the obtainment of a three-dimensional manufactured object in which the manufacturing accuracy is ensured.

EXAMPLES

Example 1

The present example relates to improving the manufacturing accuracy by containing the absorber of the present invention. In order to clarify a difference regarding the manufacturing accuracy, 1.5 mm-thick powder pellets were fused and solidified by irradiation with laser light, and the state in a boundary between an irradiation portion with the laser light and a non-irradiation portion was observed. As a sample 1, a powder mixture (the compositional ratio was $Al_2O_3$:64.40 vol %, $Gd_2O_3$:32.73 vol %, and $Tb_4O_7$:2.87 vol %) of $Al_2O_3$ powder, $Gd_2O_3$ powder, and $Tb_4O_7$ powder was formed as the 1.5 mm-thick powder pellets and irradiated with an Nd:YAG laser (1,070 nm) having a focal diameter of 100 µm and a laser power of 30 W at two kinds of laser light irradiation rates of 100 mm/sec and 250 mm/sec in 40 10 mm-long lines arrayed at 50 µm pitches.

In addition, as a comparative sample 1, $Al_2O_3$ powder alone was used, and, as a comparative sample 2 (GdTb), single pulverized powder made of an $AlO_3$—$Al_2O_3$ eutectic body (the raw material compositional ratio for forming the eutectic body was $Al_2O_3$:64.40 vol %, $Gd_2O_3$:32.73 vol %, and $Tb_4O_7$:2.87 vol %) was used, and both samples were irradiated with laser light in the same manner as the sample 1.

$Tb_4O_7$ that was an example of the absorber employed herein was in a state of including not only $Tb^{3+}$ but also $Tb^{4+}$. In addition, in volume composition calculation, as true densities, $Al_2O_3$:3.96 [g/cm$^3$], $Gd_2O_3$:7.40 [g/cm$^3$], and $Tb_4O_7$:7.60 [g/cm$^3$] were used. Even when these true densities were somewhat different values, the essence of the present invention is not affected.

The comparative sample 1 did not include the absorber, and the comparative sample 2 was present in a form in which a $Gd^{3+}$ site in $GdAlO_3$ was substituted with Tb and in a state in which $Tb^{3+}$ was rarely present and the absorption effect was lost. These two comparative samples having no absorber effect remained in an almost powder state in a laser light irradiation condition of 250 mm/sec, and structures dissolved and then solidified at 100 mm/sec were clearly obtained. However, the samples did not have the absorption effect, and thus the surfaces were significantly uneven in a heated state, manufactured objects on a two-dimensional surface could not be obtained even after solidified, and a state in which particles that had been locally fused and solidified were rolling was formed.

Meanwhile, in the sample 1, it was possible to confirm that the powder mixture was sufficiently dissolved from 250 mm/sec and a two-dimensional manufactured object was formed in a planar shape. In addition, it was confirmed from the fluorescent observation of ultraviolet excitation that, in the manufactured object in the irradiation portion, $Tb_4O_7$ was incorporated into the Gd site of $GdAlO_3$ as Tb', and the same absorption effect as in the comparative sample 2 reached a low state. It was found from the valence state of the absorber that, in the sample 1, the absorber was mixed into the powder in a state of the absorptance being 60% or more, and, after the irradiation with laser light, the fluorescence observation showed that tetravalent absorber was rarely present and thus the absorptance reached 30% or less. In addition, in the comparative sample 2, the fluorescent observation showed that the absorptance was 30% or less from the powder state before manufacturing and the absorptance did not change even after the irradiation with laser light and was still 30% or less.

Figure 4:
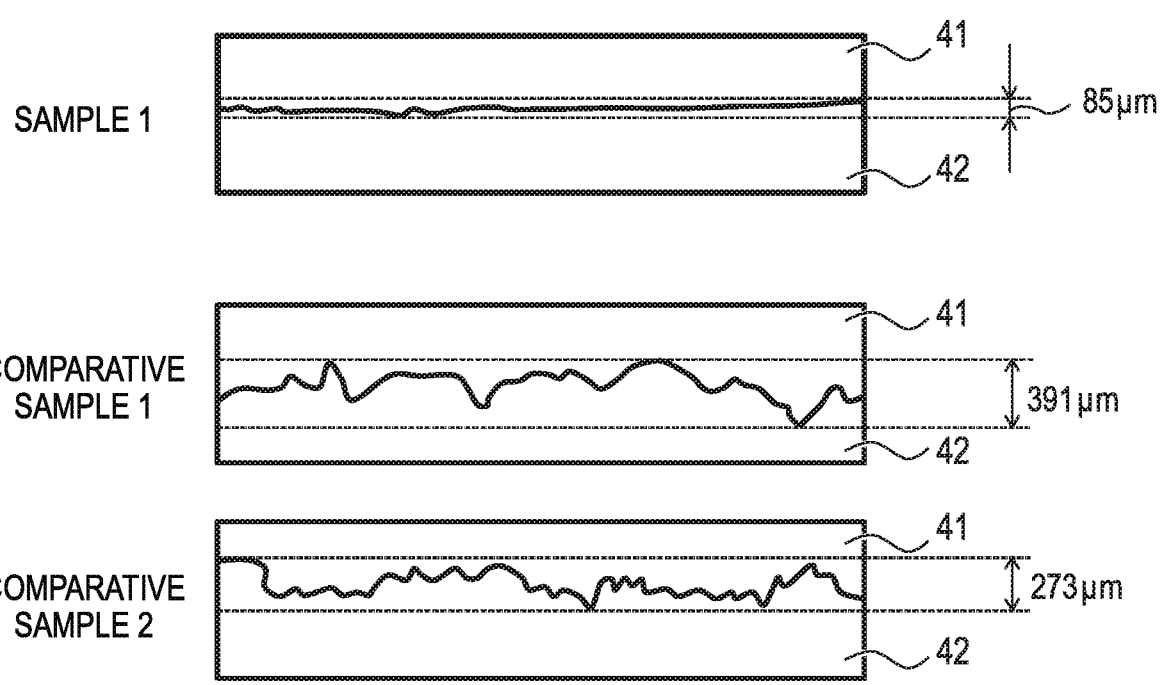
FIG. 4 is a view illustrating measurement results of deflection widths of outlines of boundary portions between a laser-irradiated region and a non-irradiated region.

FIG. 4 shows the results of calculating the deflection widths of the outlines of boundary portions observed by cutting an image of a boundary between an irradiated region 42 with laser light and a non-irradiated region 41 from a micrograph in a width of 3.83 mm. The widths were 391 μm in the comparative sample 1, 273 μm in the comparative sample 2, and 85 μm in the sample 1. In addition, the manufactured region in the sample 1 and the powder of the comparative sample 2 were in the same state in terms of the effect of the absorber, and thus it was clarified that, in the sample 1, manufacturing was possible at 250 mm/sec in the powder region in which the absorber functioned and the manufactured region rarely functioned at 250 mm/sec.

From the above-described results, it was found that the sample of the present invention was more favorable in terms of manufacturing accuracy than the comparative samples, did not disturb the region again in which the process had been completed, and was capable of obtaining a manufactured object. In addition, the metal oxide $Tb_4O_7$ that was an example of the absorber also had a valence of 4+; however, in the manufactured region, the valence was decreased to 3+, whereby the absorption characteristic was changed. The irradiation condition of laser light is changed depending on the ambient environment, material configuration, the thickness of the powder layer, and the like and is thus not limited only to values described in the present example.

Example 2

The present example relates to an effect of adding $Tb_4O_7$ that is a candidate of the absorber. $Tb_4O_7$ has a value of 60% or more as the absorptance near 1,070 nm, and, when a state of only $Tb^{3+}$ such as $Tb_2O_3$ is formed, the absorptance reaches 30% or less. In Example 1, as the sample 1, the powder mixture of $Al_2O_3$ powder, $Gd_2O_3$ powder, and $Tb_4O_7$ powder (the compositional ratio was $Al_2O_3$:64.40 vol %, $Gd_2O_3$:32.73 vol %, and $Tb_4O_7$:2.87 vol %) was used, and, in addition to this, samples 2, 3, 4, and 5 and a comparative sample 3 were prepared as shown in Table 1. At this time, regarding the particle diameter of the $Tb_4O_7$ powder, powder having a particle diameter of approximately 2 μm was used.

These powders were spread and evened on an $Al_2O_3$ base material in a thickness of approximately 20 μm and then irradiated with an Nd:YAG laser. The conditions were a focal size of 20 μm, 10 W, 50 mm/sec, and 12 4.5 mm-long lines arrayed at 50 μm pitches.

TABLE 1

|  | $Al_2O_3$ [vol %] | $Gd_2O_3$ [vol %] | $Tb_4O_7$ [vol %] | Width of boundary portion [μm] | Effect |
|---|---|---|---|---|---|
| Sample 1 | 64.4 | 32.74 | 2.87 | 8.8 | ⊚ |
| Sample 2 | 64.4 | 28.41 | 7.19 | 12.6 | ⊚ |
| Sample 3 | 64.4 | 34.92 | 0.68 | 23.9 | ⊚ |
| Sample 4 | 64.39 | 35.54 | 0.07 | 55.3 | ○ |
| Sample 5 | 64.43 | 35.55 | 0.014 | 57.8 | ○ |
| Comparative sample 3 | 64.39 | 35.61 | 0 | 61.6 | X |

For the respective samples, the widths of boundary portions between an irradiated region with laser light and a non-irradiated region were observed in a width range of 2 mm. The results are shown in Table 1. In the table, the amounts (vol %) of the respective compositions blended, the widths (μm) of the boundary portions, and the effect of adding $Tb_4O_7$ are expressed as "excellent ⊚", "favorable ○", and "unavailable x". Meanwhile, the width of the boundary portion (deflection width) is an index substantially equivalent to the surface roughness of a side surface of a manufactured object, and, as the value increases, the surface of the manufactured object becomes rougher. A standard surface roughness of a manufactured object manufactured using metal powder is said to be approximately a dozen micrometers. Therefore, a case where the width is the same as the standard surface roughness is evaluated as "⊚". In other examples as well, the same standards will be used in evaluation.

In the comparative sample 3 not including the absorber, a number of granules of the dissolved substance were generated in the boundary portion, and the width of the boundary portion was broadest. On the other hand, it was clarified that the addition of the absorber (the samples 1 to 5) narrows the widths of the boundary portions. That is, it is found that the effect is obtained by including the absorber of the present invention. Particularly, it was confirmed that, in the samples 1 to 3, the widths became narrower. Therefore, it was clarified that, when $Tb_4O_7$ that is an example of the absorber of the present invention is added, determination results shown in Table 1 are obtained, and an effect that the manufacturing accuracy improves in a broader composition range than in a case where the absorber is not added is obtained.

Example 3

The present example relates to an effect of adding $Pr_6O_{11}$ (praseodymium oxide) that is a candidate of the absorber. $Pr_6O_{11}$ or in a valence state close thereto has a value of 80% or more as the absorptance near 1,070 nm, and, when a state of $Pr^{3+}$ such as $Pr_2O_3$ is large, the absorptance reaches 50% or less. As a sample 6, a powder mixture of $Al_2O_3$ powder, $Gd_2O_3$ powder, and $Pr_6O_{11}$ powder (the compositional ratio was $Al_2O_3$:63.85 vol %, $Gd_2O_3$:33.29 vol %, and $Pr_6O_{11}$: 2.86 vol %) was used. At this time, regarding the particle diameter of the $Pr_6O_{11}$ powder, powder having a particle diameter of approximately 2 μm was used. In volume composition calculation, as true densities, $Al_2O_3$:3.96 [g/cm$^3$], $Gd_2O_3$:7.40 [g/cm$^3$], and $Pr_6O_{11}$:7.20 [g/cm$^3$] were used. Even when these true densities were somewhat different values, the essence of the present invention is not affected.

In the same manner as in Example 2, these powders were spread and evened on an $Al_2O_3$ base material in a thickness of approximately 20 μm and then irradiated with an Nd:YAG laser. The conditions were a focal size of 20 μm, 10 W, 50 mm/sec, and 12 4.5 mm-long lines arrayed at 50 μm pitches.

TABLE 2

| | $Al_2O_3$ [vol %] | $Gd_2O_3$ [vol %] | $Pr_6O_{11}$ [vol %] | Width of boundary portion [μm] | Effect |
|---|---|---|---|---|---|
| Sample 6 | 63.85 | 33.29 | 2.86 | 42.7 | ○ |

The width of a boundary portion between an irradiated region with laser light and a non-irradiated region was observed in a width range of 2 mm. The result is shown in Table 2. As shown in Table 2, the amounts (vol %) of the respective compositions blended are as shown above, and the width of the boundary portion was 42.7 μm, and the effect of adding $Pr_6O_{11}$ was "favorable ○".

Compared with the sample 4 in Example 2, it is shown that the width of the boundary portion was narrow, and it was clarified that, when $Pr_6O_{11}$ that is an example of the absorber of the present invention is added, a determination result shown in Table 2 is obtained, and an effect that the manufacturing accuracy improves more than in a case where the absorber is not added is obtained.

Example 4

The present example relates to an effect of an absorber relative to compositions other than the absorber. Compositions studied are shown in Table 3. In volume composition calculation, as true densities, $Al_2O_3$: 3.96 [g/cm$^3$], $ZrO_2$: 5.68 [g/cm$^3$], $Y_2O_3$: 5.01 [g/cm$^3$], and $Tb_4O_7$: 7.60 [g/cm$^3$] were used. Even when these true densities were somewhat different values, the essence of the present invention is not affected.

A powder including these compositions was spread and evened on an $Al_2O_3$ base material in a thickness of approximately 20 μm and then irradiated with laser light. Regarding the conditions, two 4.5 mm-long lines were drawn at a 50 μm pitch in a focal size of 100 μm and 30 W at scanning rates of 50, 100, 200, and 500 mm/sec, and fused states were compared with each other.

TABLE 3

| | $Al_2O_3$ [vol %] | $ZrO_2$ [vol %] | $Y_2O_3$ [vol %] | $Tb_4O_7$ [vol %] | Reached manufacturing rate [mm/sec] |
|---|---|---|---|---|---|
| Comparative sample 4 | 100 | | | | 100 |
| Sample 7 | 97.14 | | | 2.86 | 500 |
| Comparative sample 5 | | 100 | | | 100 |
| Sample 8 | 97.14 | | | 2.86 | 500 |
| Comparative sample 6 | 42.19 | 57.81 | | | 200 |
| Sample 9 | 41.5 | 55.64 | | 2.86 | 500 |
| Comparative sample 7 | 66.28 | | 33.72 | | 200 |
| Sample 10 | 66.11 | | 31.03 | 2.86 | 500 |

Pure $Al_2O_3$ in a comparative sample 4 remained in a state in which $Al_2O_3$ could be fused and solidified in a line shape until 100 mm/sec; however, in a sample 7 to which the absorber was added, $Al_2O_3$ could be fused and solidified in a line shape until 500 mm/sec. Pure $ZrO_2$ in a comparative sample 5 remained in a state in which $ZrO_2$ could be fused and solidified in a line shape until 100 mm/sec; however, in a sample 8 to which the absorber was added, $ZrO_2$ could be fused and solidified in a line shape until 500 mm/sec. In addition, a comparative sample 6 close to a eutectic composition of an $Al_2O_3$—$ZrO_2$ system remained in a state in which the comparative sample could be fused and solidified in a line shape until 200 mm/sec; however, in a sample 9 to which the absorber was added, the sample could be fused and solidified in a line shape until 500 mm/sec. Furthermore, a comparative sample 7 close to a eutectic composition of an $Al_2O_3$—$Y_2O_3$ system remained in a state in which the comparative sample could be fused and solidified in a line shape until 200 mm/sec; however, in a sample 10 to which the absorber was added, the sample could be fused and solidified in a line shape until 500 mm/sec.

From the above-described results, it was possible to confirm that, as a result of adding $Tb_4O_7$ that is an example of the absorber to a variety of the systems, the systems can be fused and solidified by scanning at a higher rate. Therefore, this absorber contributes to improving the manufacturing accuracy of a manufactured object regardless of material systems.

Example 5

The present example relates to a 3D manufacturing property in the case of containing the absorber. Individual particle diameters of compositions forming a powder that was used in the present example are shown in Tables 4 and 5. In addition, as the particles of these compositions, spherical particles were used except for $Tb_4O_7$ and $Pr_6O_{11}$ that were caused to function as the absorber.

TABLE 4

| | $Al_2O_3$ | $ZrO_2 \cdot Y_2O_3$ | $Gd_2O_3$ | $Y_2O_3$ | $SiO_2$ | $Tb_4O_7$ | $Pr_6O_{11}$ |
|---|---|---|---|---|---|---|---|
| Particle diameter [μm] | 20 | 30 | 25 | 23 | 28 | 3 | 3 |

TABLE 5

| | Al$_2$O$_3$·ZrO$_2$ (85:15 wt %) | Al$_2$O$_3$·ZrO$_2$ (70:30 wt %) | 2MgO·2Al$_2$O$_3$·5SiO$_2$ |
|---|---|---|---|
| Particle diameter [μm] | 39 | 109 | 121 |

Regarding material systems carried out, volume compositions are shown in Tables 6 and 7.

TABLE 6

| Constituent material [Vol %] | Al$_2$O$_3$ | ZrO$_2$·Y$_2$O$_3$ | Gd$_2$O$_3$ | Y$_2$O$_3$ | SiO$_2$ | Tb$_4$O$_7$ | Pr$_6$O$_{11}$ |
|---|---|---|---|---|---|---|---|
| Comparative sample 8 | 100 | | | | | | |
| Sample 11 | 97.15 | | | | | 2.85 | |
| Sample 12 | | 97.15 | | | | 2.85 | |
| Sample 13 | 64.40 | | 32.74 | | | 2.86 | |
| Sample 14 | 64.40 | | 34.92 | | | 0.68 | |
| Sample 15 | 66.11 | | | 31.03 | | 2.86 | |
| Sample 16 | 63.85 | | 33.29 | | | | 2.86 |
| Sample 17 | 65.64 | | | 31.79 | | | 2.57 |
| Sample 18 | 60.29 | 6.41 | 30.43 | | | 2.87 | |
| Sample 19 | | | | | 97.13 | 2.87 | |
| Sample 20 | 4.73 | | | | 92.41 | 2.86 | |
| Sample 21 | | 4.50 | | | 92.63 | 2.87 | |

TABLE 7

| | Constituent material [Vol %] | | | |
|---|---|---|---|---|
| | Al$_2$O$_3$·ZrO$_2$ (85:15 wt %) | Al$_2$O$_3$·ZrO$_2$ (70:30 wt %) | 2MgO·2Al$_2$O$_3$·5SiO$_2$ | Tb$_4$O$_7$ |
| Sample 22 | 97.15 | | | 2.85 |
| Sample 23 | | 97.15 | | 2.85 |
| Sample 24 | | | 97.14 | 2.86 |

In volume composition calculation, as true densities, Al$_2$O$_3$: 3.96 [g/cm$^3$], ZrO$_2$Y$_2$O$_3$: 6.05 [g/cm$^3$], Gd$_2$O$_3$: 7.40 [g/cm$^3$], Y$_2$O$_3$: 5.01 [g/cm$^3$], SiO$_2$: 2.20 [g/cm$^3$], Tb$_4$O$_7$: 7.60 [g/cm$^3$], Pr$_6$O$_{11}$: 7.20 [g/cm$^3$], Al$_2$O$_3$ZrO$_2$ (85:15 wt %): 4.13 [g/cm$^3$], Al$_2$O$_3$·ZrO$_2$ (70:30 wt %): 4.46 [g/cm$^3$], and 2MgO·2Al$_2$O$_3$·5SiO$_2$: 2.60 [g/cm$^3$] were used. Even when these true densities were somewhat different values, the essence of the present invention is not affected.

In the studies of the present example, as a manufacturing machine, ProX (trade name) series DMP100 manufactured by 3D Systems, Inc. was used. From a comparative sample 8 including no absorber and samples 11 to 24 constituted of a plurality of compositions including the absorber, 6×6×6 mm manufactured objects were produced under manufacturing conditions shown in Table 8. The manufacturing properties were determined as described below. The manufactured object does not form a shape: poor "x", a front surface or side surface is roughened: slightly poor "O", and the manufactured object having designated dimensions can be obtained: favorable "CD". In addition, for all of the manufactured objects, the thickness of a powder layer was set to 20 μm, and an alumina plate was used as the base material. The thickness of the powder layer refers to a value that moves the manufacturing stage portion 12 in FIG. 1 down, and the powder layer fuses and shrinks in the thickness direction by irradiation with laser light, and thus the apparent thickness of the powder layer gradually increases while lamination is repeated and converges to a range of 67 to 133 μm. Therefore, the average particle diameters of the compositions shown in Tables 4 and 5 are larger than the powder layer during manufacturing (20 μm), which does not cause any practical problem. For the manufactured objects that could be manufactured, the surface roughness Ra was measured using Alpha-step (trade name) manufactured by KLA Tencor Corporation, and the manufacturing accuracy was confirmed. The side surface was relatively significantly roughened compared with the front surface of the manufactured object, and thus evaluation was carried out on the side surface. In addition, a scanning width during calculation was 1 mm.

TABLE 8

| Manufacturing conditions | Laser power [W] | Laser irradiation rate [mm/s] | Laser irradiation line pitch [μm] | Manufacturing property | Side surface roughness of manufactured object Ra [μm] |
|---|---|---|---|---|---|
| Comparative sample 8 | 50 | 60 | 50 | X | Unmeasurable |
| Sample 11 | 47.5 | 150 | 100 | ○ | 20.6 |
| Sample 12 | 45 | 60 | 100 | ○ | 22.3 |
| Sample 13 | 30 | 140 | 100 | ⊚ | 15.0 |
| Sample 14 | 30 | 110 | 100 | ⊚ | 12.0 |
| Sample 15 | 30 | 130 | 100 | ⊚ | 12.5 |
| Sample 16 | 30 | 110 | 100 | ⊚ | 12.4 |
| Sample 17 | 30 | 80 | 100 | ○ | 22.6 |
| Sample 18 | 30 | 130 | 120 | ⊚ | 14.3 |
| Sample 18 | 47.5 | 60 | 100 | ○ | 25.4 |
| Sample 28 | 47.5 | 80 | 100 | ○ | 21.5 |
| Sample 21 | 47.5 | 60 | 100 | ○ | 23.8 |
| Sample 22 | 30 | 120 | 100 | ⊚ | 14.7 |
| Sample 23 | 30 | 120 | 100 | ⊚ | 16.2 |
| Sample 24 | 40 | 100 | 100 | ○ | 20.7 |

As shown in Table 8, the comparative sample 8 containing no absorber of the present invention partially dissolved like the comparative sample 1 of Example 1, but was not capable of maintaining the shape as the manufactured object as a result of lamination manufacturing.

The other samples 11 to 24 could be densely formed as laminated manufactured objects, and the surface roughness of the side surfaces could be measured. It was shown that the absorber of the present invention improves the surface roughness, particularly, a manufactured object having a surface roughness suppressed to approximately a dozen micrometers can be obtained, and accurate manufacturing is possible.

Example 6

The present example relates to a case where compositions other than the absorber are separate particles and a case where the compositions are the same particle. Comparison with a sample in which the sample 13 of the example 5, $Al_2O_3$, and $Gd_2O_3$ were eutectic powders (a mixed state of $Al_2O_3$ and $GdAlO_3$) and into which $Tb_4O_7$ was mixed and, furthermore, comparison with a sample in which the sample 15, $Al_2O_3$, and $Y_2O_3$ were eutectic powders (a mixed state of $Al_2O_3$ and $Y_3Al_5O_{12}$) and into which $Tb_4O_7$ was mixed were carried out.

In the same manner as in Example 5, as a manufacturing machine, ProX (trade name) DMP100 manufactured by 3D Systems, Inc. was used. A 6×6×6 mm manufactured object was produced under manufacturing conditions shown in Table 11. The manufacturing property was determined as described below. The manufactured object does not form a shape: poor "x", a front surface or side surface is roughened: slightly poor "○", and the manufactured object having designated dimensions can be obtained: favorable "◉". In addition, for all of the manufactured objects, the thickness of a powder layer was set to 20 μm, and an alumina plate was used as the base material.

As shown in Table 11, for both the samples 25 and 26, the manufacturing property was favorable "◉", and the surface roughness was also approximately a dozen micrometers. As described above, it was possible to confirm that, both in the case of using a powder in which compositions form separate particles and in the case of using a powder in which compositions other than the absorber are included in the same particle as in the present example like in the sample 13 and the sample 25 and in the sample 15 and the sample 26, the manufacturing properties are favorable. Therefore, it was shown that the effect of the absorber of the present invention does not depend on the formation of the powder excluding the absorber.

Example 7

The present example relates to an example of the degree of permitting a change in the irradiation condition of laser light in the case of using the absorber of the present invention. The powder mixture of $Al_2O_3$ powder, $Gd_2O_3$ powder, and $Tb_4O_7$ powder (the compositional ratio was $Al_2O_3$:64.40 vol %, $Gd_2O_3$:32.73 vol %, and $Tb_4O_7$:2.87 vol %), which is the powder configuration of the sample 13 of Example 5, was used, and, as a manufacturing machine, ProX (trade name) DMP200 manufactured by 3D Systems, Inc. was used.

The irradiation rate with laser light was 500 mm/s, the irradiation line pitch of laser light was fixed to 130 μm, and the energy density during manufacturing was increased and decreased by changing the laser power. The thickness of a powder layer was set to 25 μm, and an alumina plate was used as the base material. A 6×6×6 mm manufactured object was produced at a laser power shown in Table 12, and the manufacturing property was determined as described below. The manufactured object does not form a shape: poor "x", a front surface or side surface is roughened: slightly poor "○", and the manufactured object having designated dimensions can be obtained: favorable "◉".

TABLE 9

|  | $Al_2O_3 \cdot Gd_2O_3$ (50:50 wt %) | $Al_2O_3 \cdot Y_2O_3$ |
| --- | --- | --- |
| Particle diameter [μm] | 33 | 36 |

TABLE 10

|  | Constituent material [Vol %] | | |
| --- | --- | --- | --- |
|  | $Al_2O_3 \cdot Gd_2O_3$ (50:50 wt %) | $Al_2O_3 \cdot Y_2O_3$ (63:37 wt %) | $Tb_4O_7$ |
| Sample 25 | 97.14 |  | 2.86 |
| Sample 26 |  | 97.14 | 2.86 |

TABLE 11

| Manufacturing conditions | Laser power [W] | Laser irradiation rate [mm/s] | Laser irradiation line pitch [μm] | Manufacturing property | Side surface roughness of manufactured object: Ra [μm] |
| --- | --- | --- | --- | --- | --- |
| Sample 25 | 30 | 100 | 130 | ◉ | 15.4 |
| Sample 26 | 30 | 100 | 130 | ◉ | 16.1 |

TABLE 12

| Laser power [W] | Manufacturing property |
| --- | --- |
| 65 | X |
| 75 | ○ |
| 84 | ○ |
| 95 | ◉ |
| 106 | ◉ |
| 115 | ◉ |
| 120 | ◉ |
| 125 | ◉ |
| 132 | ◉ |
| 134 | ◉ |
| 140 | ◉ |
| 146 | ○ |
| 150 | ○ |

TABLE 12-continued

| Laser power [W] | Manufacturing property |
|---|---|
| 154 | ◯ |
| 160 | X |

When the laser power was 65 W, the powder rarely fused, the form of the manufactured object collapsed, and the manufacturing property was poor "x". When the laser power was 75 W and 84 W, the energy necessary for dissolution tended to lack, the surface of the manufactured object became powdered, and the manufacturing property was slightly poor "◯". In a range from 95 W to 140 W, the surface of the manufactured object was flat, and the manufacturing property was favorable "⊚". Furthermore, when the laser powder was in a range of 146 W to 154 W, the amount of energy injected was large, and the surface swelled and showed a tendency of becoming uneven, and thus the manufacturing property was slightly poor "◯". When the laser power was 160 W, the amount of energy injected was too large, the form of the manufactured object collapsed, and the manufacturing property was poor "x".

From what has been described above, it was possible to confirm that, at least in a range of 75 W to 154 W, an increase in energy density of up to approximately twice is permitted and the powder can be stably manufactured. This reflects that the powder of the present invention has an absorption capability only in a powder form and, once incorporated into a manufactured object, decreases in absorptance and is not easily affected by irradiation with laser light, and thus, even when the power of laser light fluctuates, the powder does not easily affect manufacturing.

Example 8

The present example is an example in which $SiO_2$ particles were added. A powder for ceramic manufacturing of the present example was manufactured in the following order. As a principal component, a component obtained by mixing $Al_2O_3$ powder (purity: 99.99% or more, particle diameter: 20 µm) and $Gd_2O_3$ powder (purity: 99.99% or more, particle diameter: 20 µm) so that the mass ratio reached 1:1 was used. As an absorber, $Tb_4O_7$ powder (purity: 99.9% or more, particle diameter: 4 µm) was used. As the $SiO_2$ particles, particles having a purity of 99.9% or more and a particle diameter of 4 µm were used.

The particles forming the principal component, the particles forming the absorber, and the $SiO_2$ particles were weighed so that the mass ratio of the respective powders reached 96.4:3.5:0.14. The weighed powders were mixed in a dry-type ball mill for 30 minutes, thereby obtaining a powder mixture (powder for ceramic manufacturing) (sample 27).

The powder for ceramic manufacturing was heated and dissolved using dilute sulfuric acid, and a composition analysis was carried out by ICP atomic emission spectroscopy. The mass ratio of $Al_2O_3$, $Gd_2O_3$, $Tb_4O_7$, and $SiO_2$ was 48.2:48.2:3.5:0.14 and was identical to a prepared compositional ratio. The content of a component other than the above-described components was less than 0.2% by mass of the powder for ceramic manufacturing. A mass ratio α [%] of the $SiO_2$ particles to the mass of the particles made of the composition other than the absorber included in a powder for ceramic manufacturing of a sample 27 (the principal component forming a ceramic structure), that is, $α=SiO_2/(Al_2O_3+Gd_2O_3+ZrO_2)$ was calculated from a compositional ratio obtained by an analysis and found out to be α=0.146 [%]. A mass ratio [%] of the $SiO_2$ particles to the mass of the particles made of the composition forming the absorber, that is, $β=SiO_2/(Tb_4O_7+Pr_6O_{11})$ was calculated and found out to be (β=4.03 [%]. A mass ratio γ [%] of the particles forming the principal component and the particles forming the absorber, that is, $γ=(Tb_4O_7+Pr_6O_{11})/(Al_2O_3+Gd_2O_3+ZrO_2)$ was calculated and found out to be γ=3.61 [%]. As a result of analyzing some of the powder for ceramic manufacturing by scanning electron microscopy coupled with energy dispersive X-ray (SEM-EDX), it was possible to confirm an appearance in which $SiO_2$ particles having a particle diameter of several micrometers were dispersed in the powder.

Examples 9 to 25

Powders for ceramic manufacturing of samples 28 to 44 were manufactured as Examples 9 to 25 in the same manner as in Example 8 with the exception that the kind of the raw material and the blending ratio were changed according to Table 13. As zirconium oxide, $ZrO_2$ powder (purity: 99.9% or more, particle diameter: 15 µm) was used. As praseodymium oxide, $Pr_6O_{11}$ powder (purity: 99.9% or more, particle diameter: 4 µm) was used. As a result of analyzing the compositions of the powders for ceramic manufacturing of the samples 28 to 44 in the same manner as in Example 8, the mass ratio of $Al_2O_3$, $Gd_2O_3$, $ZrO_2$, $Tb_4O_7$, $Pr_6O_{11}$, and $SiO_2$ was identical to a prepared compositional ratio. The content of a component other than the above-described components was less than 0.5% by mass of the powder for ceramic manufacturing. α, β, and γ were calculated from a compositional ratio obtained by an analysis in the same manner as in Example 8, and the results are shown in Table 14. As a result of analyzing some of the produced powder for ceramic manufacturing by SEM-EDX, it was possible to confirm an appearance in which $SiO_2$ particles having a particle diameter of several micrometers were dispersed in the powder.

Comparative Example

A powder for ceramic manufacturing for comparison was manufactured in the same manner as in Example 8 according to a blending ratio shown in Table 13. However, in the present comparative example, $SiO_2$ particles were not used, and the powder for ceramic manufacturing for comparison was formed only with $Al_2O_3$ and $Gd_2O_3$, and $Tb_4O_7$ that was a particle forming an absorber. As a result of analyzing the compositions of the powder for ceramic manufacturing of Comparative Example in the same manner as in Example 8, the mass ratio of $Al_2O_3$, $Gd_2O_3$, and $Tb_4O_7$ was identical to a prepared compositional ratio. The content of $SiO_2$ was less than 50 ppm of the powder for ceramic manufacturing for comparison. The content of a component other than the above-described components was less than 0.2% by mass of the powder for ceramic manufacturing.

TABLE 13

| | Particle made of constituent material other than absorber (principal component) | | | Particle that is absorber | | SiO$_2$ particle |
|---|---|---|---|---|---|---|
| | Al$_2$O$_3$ [% by mass] | ZrO$_2$ [% by mass] | Gd$_2$O$_3$ [% by mass] | Tb$_4$O$_7$ [% by mass] | Pr$_6$O$_{11}$ [% by mass] | SiO$_2$ [% by mass] |
| Sample 27 | 48.2 | — | 48.2 | 3.5 | — | 0.140 |
| Sample 28 | 41.3 | — | 41.3 | 16.5 | — | 0.826 |
| Sample 29 | 40.1 | — | 40.1 | 19.0 | — | 0.802 |
| Sample 30 | 47.3 | — | 47.3 | 5.4 | — | 0.062 |
| Sample 31 | 42.4 | — | 42.4 | 15.2 | — | 0.006 |
| Sample 32 | 44.9 | — | 44.9 | 10.2 | — | 0.026 |
| Sample 33 | 43.8 | — | 43.8 | 12.2 | — | 0.080 |
| Sample 34 | 47.4 | — | 47.4 | 4.9 | — | 0.243 |
| Sample 35 | 43.0 | — | 43.0 | 13.4 | — | 0.538 |
| Sample 36 | 48.7 | — | 48.7 | 2.5 | — | 0.067 |
| Sample 37 | 40.0 | — | 40.0 | 19.5 | — | 0.410 |
| Sample 38 | 47.4 | — | 47.4 | 5.0 | — | 0.101 |
| Sample 39 | 49.2 | — | 49.2 | 1.5 | — | 0.069 |
| Sample 40 | 47.4 | — | 47.4 | 4.9 | — | 0.286 |
| Sample 41 | 41.5 | — | 41.5 | 16.1 | — | 0.908 |
| Sample 42 | 47.4 | 47.4 | — | 5.1 | — | 0.100 |
| Sample 43 | 83.2 | — | — | 16.2 | — | 0.626 |
| Sample 44 | 44.6 | — | 44.6 | — | 10.7 | 0.115 |
| Comparative sample 9 | 45.0 | — | 45.0 | 10.1 | — | — |

TABLE 14

| | α [%] | β [%] | γ [%] |
|---|---|---|---|
| Sample 27 | 0.146 | 4.03 | 3.61 |
| Sample 28 | 1.000 | 5.00 | 20.00 |
| Sample 29 | 1.000 | 4.21 | 23.75 |
| Sample 30 | 0.066 | 1.15 | 5.71 |
| Sample 31 | 0.007 | 0.04 | 17.86 |
| Sample 32 | 0.029 | 0.25 | 11.40 |
| Sample 33 | 0.091 | 0.66 | 13.94 |
| Sample 34 | 0.256 | 4.99 | 5.12 |
| Sample 35 | 0.626 | 4.01 | 15.62 |
| Sample 36 | 0.069 | 2.64 | 2.62 |
| Sample 37 | 0.513 | 2.10 | 24.38 |
| Sample 38 | 0.106 | 2.00 | 5.32 |
| Sample 39 | 0.070 | 4.53 | 1.55 |
| Sample 40 | 0.301 | 5.82 | 5.18 |
| Sample 41 | 1.093 | 5.66 | 19.33 |
| Sample 42 | 0.105 | 1.97 | 5.35 |
| Sample 43 | 0.753 | 3.87 | 19.48 |
| Sample 44 | 0.129 | 1.08 | 11.96 |
| Comparative sample 9 | 0 | 0 | 11.17 |

Ceramic manufactured objects were formed using the powders for ceramic manufacturing of Examples 8 to 25 and Comparative Example.

Figure 5A:
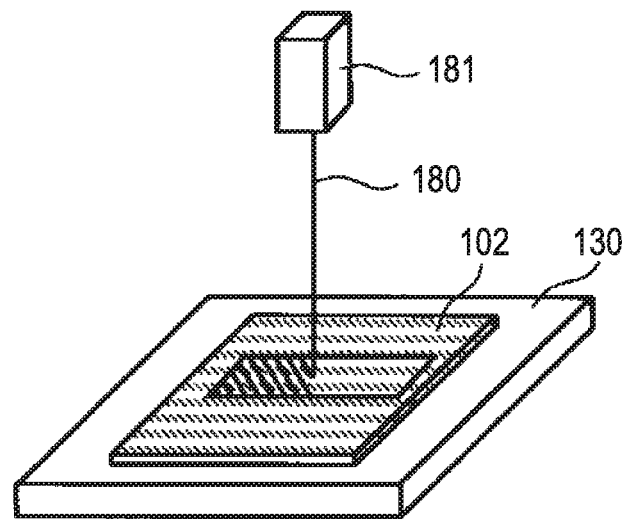
FIG. 5A is a view illustrating a process of irradiating a powder of Examples 8 to 25 of the present invention with laser light.
Figure 5B:
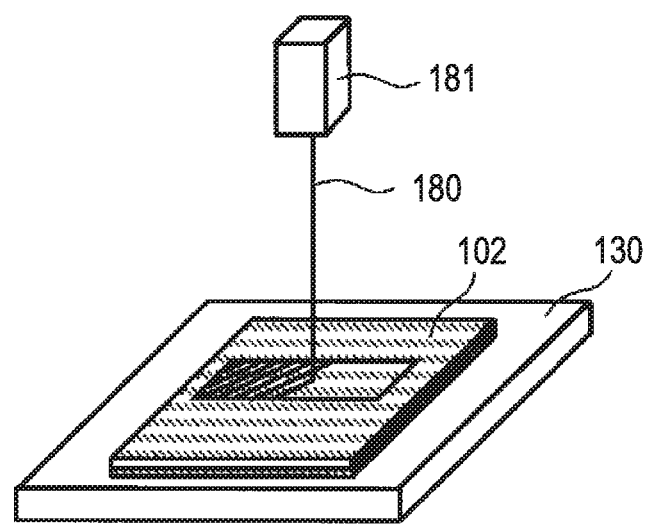
FIG. 5B is a view illustrating the process of irradiating the powder of Examples 8 to 25 of the present invention with laser light.
Figure 6A:
FIG. 6A is a view illustrating a manufactured object in which the powder of Examples 8 to 25 of the present invention is used.
Figure 6B:
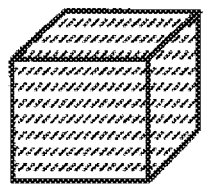
FIG. 6B is a view illustrating a manufactured object in which the powder of Examples 8 to 25 of the present invention is used.

In the formation of the manufactured objects, ProX (trade name) series DMP100 manufactured by 3D Systems, Inc. in which a 50 W Nd:YAG laser (beam diameter: 65 μm) was mounted, was used. Like a main section schematically shown in FIG. 5A and FIG. 5B, first, the powder for ceramic manufacturing was spread and evened in a laser irradiation portion on an alumina base table 130, and a 20 μm-thick powder layer 102 as a first layer was formed. Next, the powder layer was irradiated with 30 W laser light 180 from a laser source 181, and the powder present in a 5 mm×42 mm rectangular region was fused and solidified. A drawing rate was set to 100 mm/s to 140 mm/s, and a drawing pitch was set to 100 μm. In addition, as shown in FIG. 5A, drawn lines were formed at an angle of 45 degrees with respect to a side of the rectangular shape. Next, a 20 μm-thick powder layer was newly spread and evened so as to cover the fused and solidified portion. As shown in FIG. 5B, the powder layer immediately above the rectangular region was irradiated with laser light so that drawn lines orthogonalized the drawn lines in the first layer, and a 5 mm×42 mm rectangular region was fused and solidified. The above-described lamination manufacturing step was repeated, thereby forming a prismatic manufactured object having a 5 mm×42 mm bottom surface and a height of 6 mm which was intended to be used in a three-point bending strength test. With the same step, a prismatic manufactured object having a 22 mm×22 mm square bottom surface and a height of 12 mm which was for a water absorption ratio test was also formed. As a result of observing the surfaces of the manufactured objects of samples 27 to 44 and a comparative sample 9 using an optical microscope, unevenness on the manufactured object surface was 30 μm or less in the manufactured objects of the samples 27 to 39 and the samples 42 to 44 and 40 μm or less in the manufactured objects of the sample 40, the sample 41, and the comparative sample 9. The manufactured object was separated from the alumina base table and polished, thereby obtaining a W40 mm×D4 mm×H3 mm ceramic manufactured object (FIG. 6A) for the three-point bending strength test and a W20 mm×D20 mm×H10 mm ceramic manufactured object (FIG. 6B) for the water absorption ratio test. In the three-point bending strength test, a compression tester manufactured by Instron was used. The three-point bending strengths of the ceramic manufactured objects of the respective examples and Comparative Example 9 are shown in Table 15.

The water absorption ratio is expressed as a percentage of the total amount of water included in the ceramic manufactured object in a saturated and surface-dry condition to the mass of the ceramic manufactured object in an absolutely dry condition. When the mass of the ceramic manufactured object in the absolutely dry condition is represented by w1, and the mass of the ceramic manufactured object in the saturated and surface-dry condition is represented by w2, the water absorption ratio w [%] can be calculated from $w=(w2-w1)/w1\times100$.

First, the mass w1 [g] of the ceramic manufactured object in the absolutely dry condition, which had been dried at 80° C. for four hours, was measured. Next, the ceramic manufactured object was submerged below the water surface in a boiling tank, boiled for 30 minutes, and then cooled to room temperature by adding water, thereby obtaining a saturated specimen. The saturated specimen was removed from water, the surface was rapidly wiped with wet gauze, and the mass w2 [g] of the ceramic manufactured object in the saturated and surface-dry condition, from which a water droplet had been removed, was measured. The water absorption ratios w [%] were calculated from w=(w2-w1)/w1×100 and summarized in Table 15.

TABLE 15

| | Three-point bending strength [MPa] | Absorptance [%] |
|---|---|---|
| Sample 27 | 34.4 | 0.4 |
| Sample 28 | 28.6 | 0.5 |
| Sample 29 | 24.8 | 0.8 |
| Sample 30 | 31.9 | 0.4 |
| Sample 31 | 30.9 | 0.9 |
| Sample 32 | 33.2 | 0.7 |
| Sample 33 | 34.4 | 0.6 |
| Sample 34 | 27.7 | 0.7 |
| Sample 35 | 27.9 | 0.5 |
| Sample 36 | 32.0 | 0.7 |
| Sample 37 | 24.5 | 0.6 |
| Sample 38 | 28.1 | 0.5 |
| Sample 39 | 31.5 | 0.6 |
| Sample 40 | 23.1 | 0.6 |
| Sample 41 | 22.7 | 0.9 |
| Sample 42 | 29.0 | 0.5 |
| Sample 43 | 26.3 | 0.4 |
| Sample 44 | 27.3 | 0.4 |
| Comparative sample 9 | 16.6 | 1.2 |

The ceramic manufactured objects produced from the powders for ceramic manufacturing of Examples 8 to 25 had a high three-point bending strength of 20 MPa or more and a small water absorption ratio of 1.0% or less. Particularly, the ceramic manufactured objects of the samples 27, 28, 30 to 36, 38, 39, and 42 to 44 which satisfied $\alpha \leq 1.0$, $0.04 \leq \beta \leq 5$, and $\gamma \leq 20$ had a high three-point bending strength of 25 MPa or more.

When the powder for ceramic manufacturing of the present invention is used, a part of the absorber changes to a different composition that relatively weakly absorbs the laser light by irradiation with a laser, whereby a sintered or fused region is not easily affected by laser irradiation during subsequent manufacturing. In addition, the absorber relatively strongly absorbs the laser light compared to other compositions forming the powder and is thus also capable of decreasing light diffusion. As a result, it is possible to realize manufacturing of ceramic manufactured object having a high manufacturing accuracy.

The powder for ceramic manufacturing of the present invention is capable of obtaining a ceramic manufactured object having a high manufacturing accuracy by the addition of an absorber in powder bed fusion method or a cladding method and is available in a field of a ceramic component requiring a complex shape.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A powder for molding for obtaining a ceramic object by heating by means of irradiation with a laser light, the powder comprising a plurality of compositions,
   wherein at least one composition of the plurality of compositions is an absorber that has a stronger capability to absorb a light having a predetermined wavelength included in the laser light than other compositions of the plurality of compositions, and changes to a different composition that more weakly absorbs the light having the predetermined wavelength than the absorber by irradiation with the light having the predetermined wavelength,
   wherein a content of the absorber is 0.5 vol % to 53 vol %, and
   wherein the absorber forms a particle as a single compound and a particle diameter of the particle forming the absorber is 10 µm or less.

2. The powder according to claim 1, wherein the absorber is a metal compound.

3. The powder according to claim 2, wherein the powder becomes a solid material by sintering or fusing and solidifying, and a metal element included in the absorber is present in the solid material as a metal compound distinct from the absorber.

4. The powder according to claim 3, wherein a valence of the metal element included in the absorber is different from a valence of the metal element included in the solid material.

5. The powder according to claim 2, wherein the metal compound is a metal oxide.

6. The powder for manufacturing according to claim 5, wherein the absorber is terbium oxide including tetravalent terbium or praseodymium oxide including tetravalent praseodymium.

7. The powder according to claim 1, which contains, as a composition other than the absorber, aluminum oxide and gadolinium oxide.

8. The powder according to claim 1, which contains, as a composition other than the absorber, at least one of silicon oxide, aluminum oxide, and zirconium oxide.

9. The powder according to claim 8, further comprising, as a composition other than the absorber, a rare-earth oxide or a compound thereof.

10. The powder according to claim 1, wherein the powder contains a combination of metal compounds constituting a eutectic system.

11. The powder according to claim 10, wherein a compositional ratio of a metal compound constituting the eutectic system is ±10 mol % from a eutectic composition.

12. The powder according to claim 1, comprising silicon oxide particles having a particle diameter of 5 µm or less.

13. The powder according to claim 12, wherein a mass of the silicon oxide particles having the particle diameter of 5 µm or less is 0.04% to 5.0% of a mass of the absorber.

14. The powder according to claim 1, comprising a particle made of a single compound.

15. The powder according to claim 1, comprising a particle comprising two or more compounds selected from a composition other than the absorber.

16. The powder according to claim 1, wherein the powder does not contain a resin.

17. The powder according to claim 1, wherein a content of carbon is 1000 ppm or less relative to a metal element included in the powder in terms of a molar ratio.

18. The powder according to claim 1, wherein the powder has a fluidity index of 40 [sec/50 g] or less.

19. A manufacturing method for obtaining a ceramic object comprising:
   (i) a step of disposing the powder according to claim 1 in a laser irradiation portion;
   (ii) a step of sintering or fusing and then solidifying the powder by irradiating it with the laser light including the light having the predetermined wavelength; and (iii) a step of manufacturing the ceramic object by repeating the steps (i) and (ii).

20. The manufacturing method according to claim 19, wherein the step (i) comprises spreading and evening the powder in the laser irradiation portion.

21. The manufacturing method according to claim 19, wherein the step (i) comprises spraying the powder to the laser irradiation portion to place the powder.

22. The manufacturing method according to claim 19, wherein the laser light including the predetermined wavelength is irradiated in a laser focal size in which at least two absorber particles are included.

23. The powder according to claim 1, which contains a plurality of oxides as a main component.

24. The powder according to claim 14, wherein a particle diameter of an absorber particle is smaller than that of a particle of a main component.

25. The powder according to claim 24, wherein the particle diameter of the absorber particle is 1/5 or less of the particle diameter of the particle of the main component.

26. The powder according to claim 1, wherein the absorber is an oxide.

27. The powder according to claim 1, wherein the absorber changes to a composition in which absorbance capacity for the light having the predetermined wavelength is 5/6 or less of that before irradiation with the light having the predetermined wavelength.

28. The powder according to claim 1, wherein the absorber has an absorptivity of 50% or more before being irradiated with light of a wavelength contained in the laser beam, and an absorptivity of 40% or less after being changed by being irradiated with the light of the wavelength contained in the laser beam.

29. The powder according to claim 1, wherein the absorber has an absorptivity of 60% or more before being irradiated with light of a wavelength contained in the laser beam, and an absorptivity of 20% or less after being changed by being irradiated with the light of the wavelength contained in the laser beam.

30. A powder for molding for obtaining a ceramic object by heating by means of irradiation with a laser light, the powder comprising a plurality of compositions,
wherein at least a first composition of the plurality of compositions is an absorber that has a stronger capability to absorb a light having a predetermined wavelength included in the laser light than a second composition of the plurality of compositions, and changes to a different composition that more weakly absorbs the light having the predetermined wavelength than the absorber by irradiation with the light having the predetermined wavelength,
wherein a content of the absorber is 0.68 vol % to 7.19 vol %,
wherein the second composition of the plurality of compositions is at least one oxide of Al, Zr, Si, Gd, Mg, or Y, and a composition content other than that of the first composition is 92.81 vol % or more,
wherein the powder comprises a first particle, which contains the absorber, and a second particle, which contains the second composition,
wherein a particle diameter of the first particle is smaller than a particle diameter of the second particle.

31. A manufacturing method for obtaining a ceramic object comprising:

(i) a step of disposing the powder according to claim 30 in a laser irradiation portion;
(ii) a step of sintering or fusing and then solidifying the powder by irradiating it with the laser light including the light having the predetermined wavelength; and
(iii) a step of manufacturing the ceramic object by repeating the steps (i) and (ii).

32. The powder according to claim 30, wherein the absorber is a metal compound.

33. The powder according to claim 32, wherein the metal compound is a metal oxide.

34. The powder according to claim 30, wherein the absorber is an oxide.

35. The powder according to claim 30, wherein the absorber changes to a composition in which absorbance capacity for the light having the predetermined wavelength is 5/6 or less of that before irradiation with the light having the predetermined wavelength.

36. The powder according to claim 30, wherein the absorber has an absorptivity of 50% or more before being irradiated with light of a wavelength contained in the laser beam, and an absorptivity of 40% or less after being changed by being irradiated with the light of the wavelength contained in the laser beam.

37. The powder according to claim 30, wherein the absorber has an absorptivity of 60% or more before being irradiated with light of a wavelength contained in the laser beam, and an absorptivity of 20% or less after being changed by being irradiated with the light of the wavelength contained in the laser beam.

38. The powder for manufacturing according to claim 30, wherein the absorber is terbium oxide including tetravalent terbium or praseodymium oxide including tetravalent praseodymium.

39. The powder according to claim 30, wherein the first particle contains a single compound of the absorber.

40. The powder according to claim 30, comprising a third particle, which contains a third composition of the plurality of compositions, wherein the third composition of the plurality of compositions is at least one oxide of Al, Zr, Si, Gd, Mg, or Y.

41. The powder according to claim 40, wherein the particle diameter of the first particle is smaller than a particle diameter of the third particle.

42. The powder according to claim 30, wherein the particle diameter of the first particle is 1/5 or less of the particle diameter of the second particle.

43. The powder according to claim 30, comprising a particle comprising two or more compounds selected from a composition other than the absorber.

44. A powder for molding for obtaining a ceramic object by heating by means of irradiation with a laser light, the powder comprising a plurality of compositions,
wherein at least a first composition of the plurality of compositions is an absorber that has a stronger capability to absorb a light having a predetermined wavelength included in the laser light than a second composition of the plurality of compositions, and changes to a different composition that more weakly absorbs the light having the predetermined wavelength than the absorber by irradiation with the light having the predetermined wavelength,
wherein a content of the absorber is 0.68 vol % to 7.19 vol %,
wherein the second composition of the plurality of compositions is at least one oxide of Al, Zr, Si, Gd, Mg, or Y, and a composition content other than that of the first composition is 92.81 vol % or more, and wherein the powder becomes a solid material by sintering or fusing and solidifying, and a metal element included in the absorber is present in the solid material as a metal compound distinct from the absorber.

45. The powder according to claim 44, wherein a valence of the metal element included in the absorber is different from a valence of the metal element included in the solid material.

46. The powder according to claim 30, wherein the second composition is aluminum oxide.

47. The powder according to claim 46, wherein a third composition of the plurality of compositions is at least one selected from the group consisting of gadolinium oxide, silicon dioxide, zirconium oxide, magnesium oxide, and yttrium oxide.

48. The powder according to claim 30, wherein the powder contains a combination of metal compounds constituting a eutectic system.

49. The powder according to claim 48, wherein a compositional ratio of a metal compound constituting the eutectic system is ±10 mol % from a eutectic composition.

50. The powder according to claim 30, wherein the powder does not contain a resin.

51. The powder according to claim 30, wherein a content of carbon is 1000 ppm or less relative to a metal element included in the powder in terms of a molar ratio.

* * * * *